Dec. 20, 1966  E. E. LEWIS ET AL  3,292,449
POWER SYSTEM CONTROL
Filed Dec. 14, 1964  4 Sheets-Sheet 1
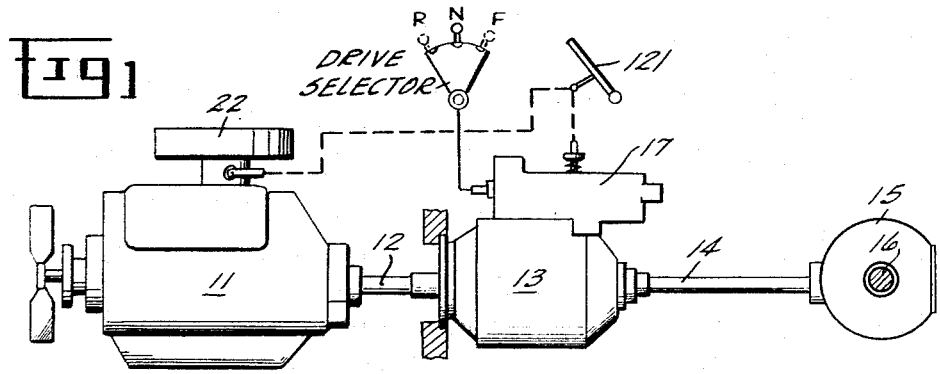
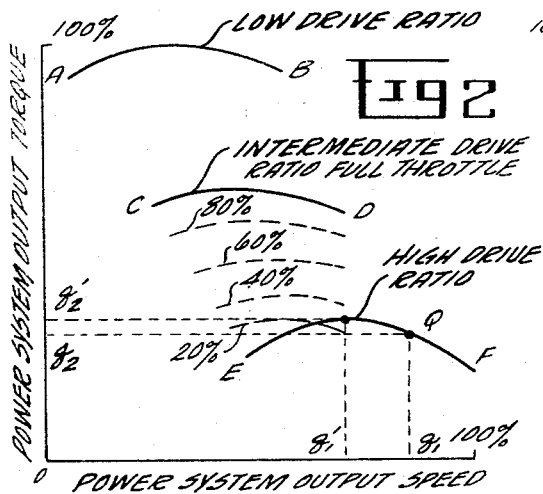
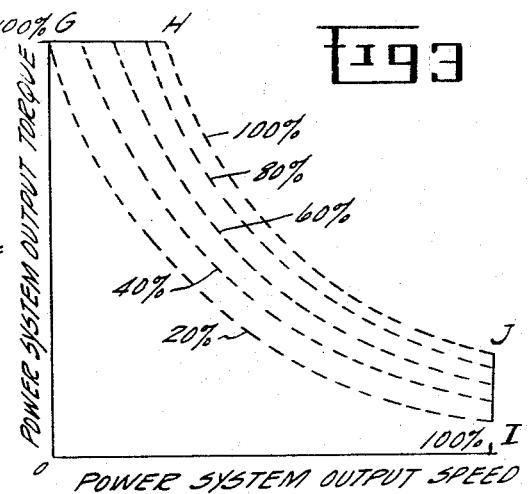
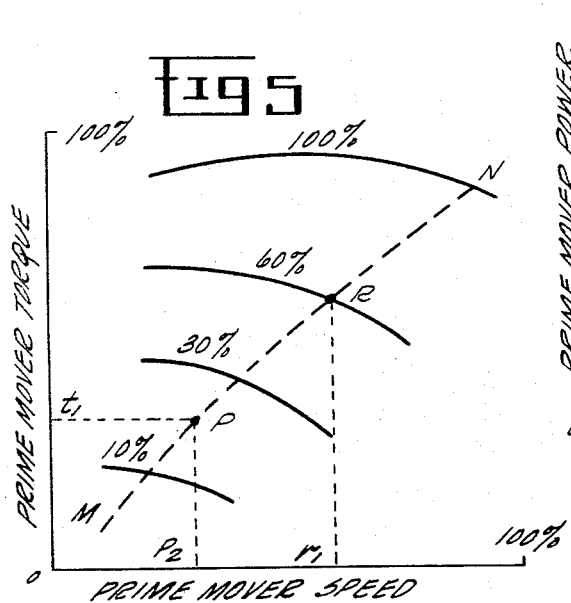
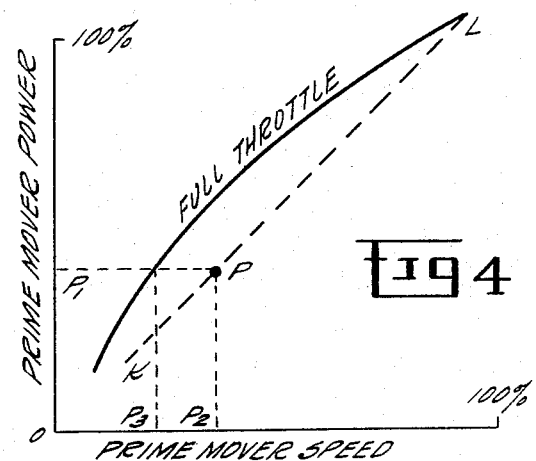
INVENTORS.
ERNEST E. LEWIS
CHARLES A. MAHER
BY George R. Powers
ATTORNEY Dec. 20, 1966  E. E. LEWIS ET AL  3,292,449
POWER SYSTEM CONTROL
Filed Dec. 14, 1964  4 Sheets-Sheet 2

INVENTORS.
ERNEST E. LEWIS
CHARLES A. MAHER
BY
George R. Power
ATTORNEY

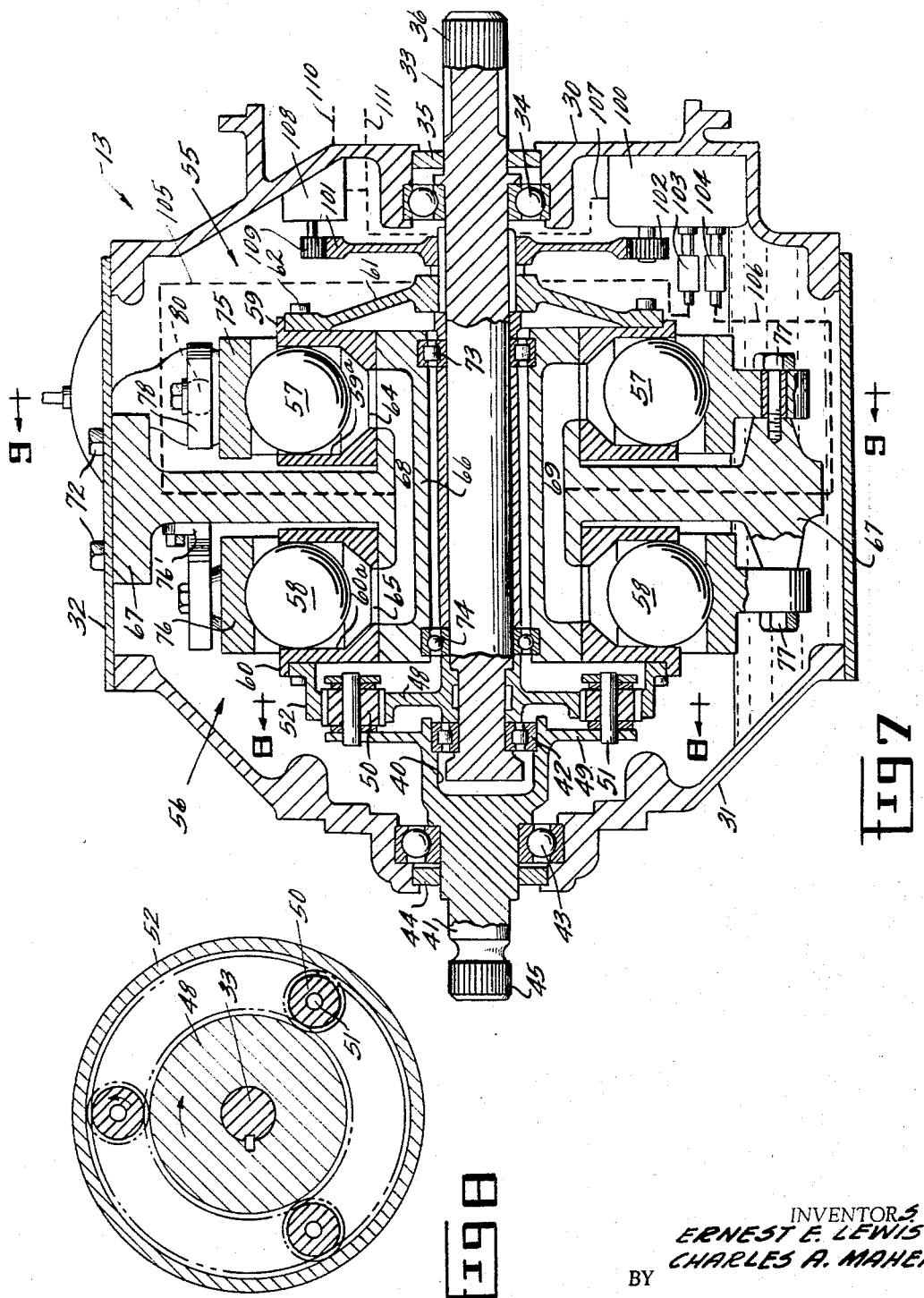

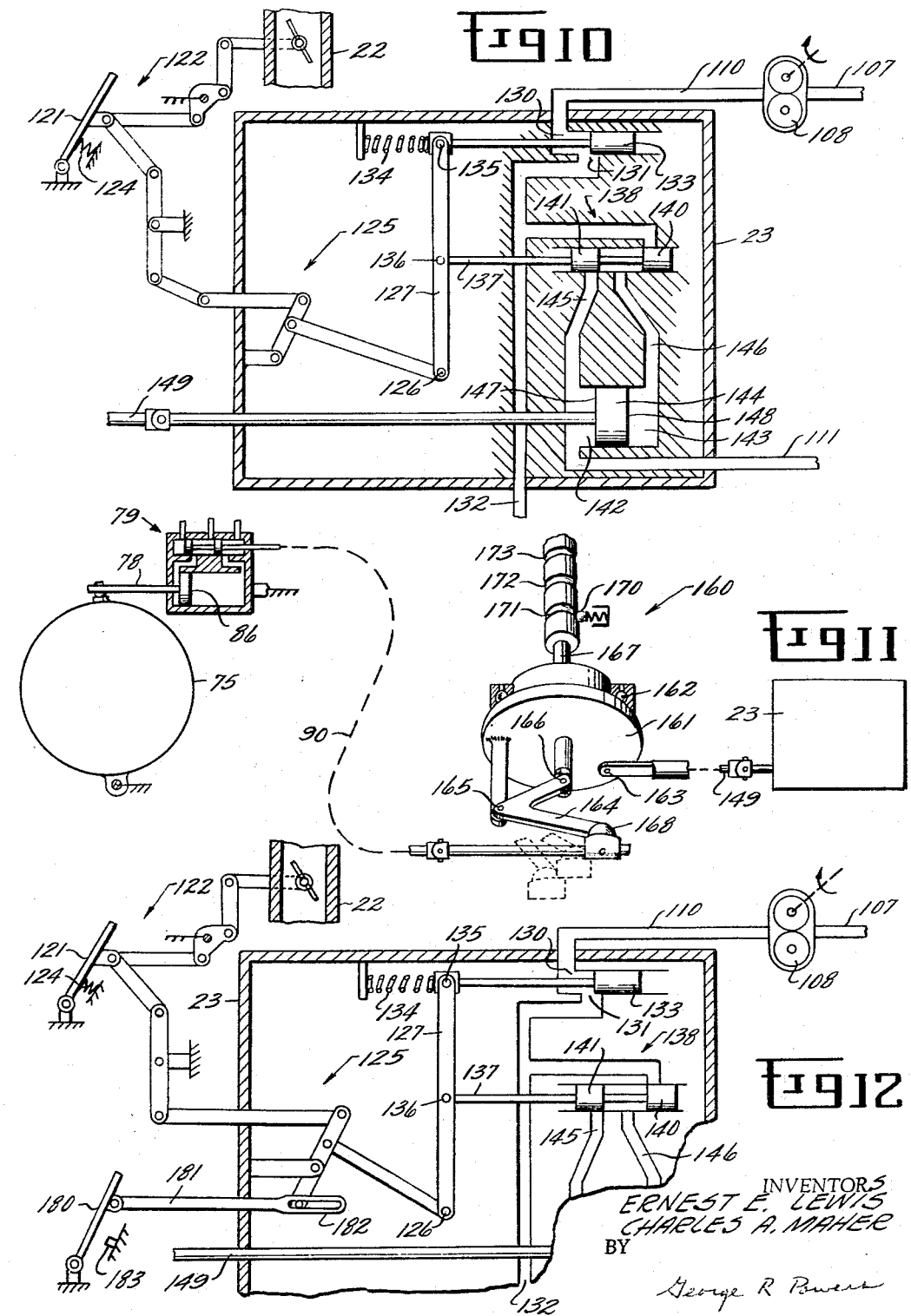

United States Patent Office 3,292,449
Patented Dec. 20, 1966

3,292,449
POWER SYSTEM CONTROL
Ernest Eber Lewis, Topsfield, and Charles Anthony Maher, Jr., Wakefield, Mass., assignors to General Electric Company, a corporation of New York
Filed Dec. 14, 1964, Ser. No. 424,872
8 Claims. (Cl. 74—472)

This application is a continuation-in-part of an application entitled "Power System Control," Serial Number 413,386, filed September 10, 1964, now abandoned, by the assignee of this invention in the names of the present applicants.

This invention relates to power system control and, more particularly, to control means for controlling the drive ratio of a power transmission having a continuously variable drive ratio such that the associated prime mover may operate at a condition of minimum specific fuel consumption.

In power systems utilizing a prime mover and a power transmission for connecting the prime mover to a load, especially where the prime mover is an internal combustion engine, it has long been desirable to provide the transmission with continuously variable drive ratio capabilities. Such a system allows the drive ratio to be varied without the disadvantages of shifting or other step changes which not only cause rough operation and accompanying wear on the entire power system when changing drive ratios, but also cause the prime mover to operate at speeds at which its fuel consumption is greater than optimum for the horsepower required to drive the load.

With a continuously variable drive ratio transmission, it is possible to integrate the control of both the prime mover and the power transmission in a manner to allow optimum operation of the power system. By proper selection of control parameters for integration of these controls, the prime mover may be operated at or near the point of lowest possible fuel consumption for the power output required by controlling the drive ratio of the power transmission.

There are, however, substantial problems in providing such an integrated control since many variables exist in such a power system. For a desired output speed of the power system, there are various combinations of prime mover speed and transmission drive ratio to supply the desired output speed. Since the selection of control parameters determines directly the complexity of the control, it is desirable that parameters be selected and utilized such that the desired control results are obtained without introducing undue complexity into the system.

It is therefore an object of this invention to provide for a power system an improved control for controlling the system output speed and drive ratio of a continuously variable drive ratio transmission.

Another object of this invention is to provide a control which controls the drive ratio of a continuously variable drive ratio transmission such that the associated prime mover may be operated at a condition of minimum specific fuel consumption.

Yet another object of the present invention is to provide a control having the above advantages while being relatively uncomplicated.

Briefly stated, in accordance with an illustrated embodiment of the invention, a power system comprises a prime mover and a continuously variable drive ratio transmission for connecting the prime mover to a load has novel control means for controlling the drive ratio of the transmission, the control means continuously comparing the actual prime mover speed with a prime mover speed required to produce a required power output at minimum specific fuel consumption and continuously adjusting the transmission drive ratio until the actual prime mover speed is equal to the required prime mover speed. Further, so long as the maximum power output capabilities of the power system are not exceeded, the control means of the invention permits the attainment of any power system output speed desired from the power system by an operator, the control means selecting a transmission drive ratio which produces the desired system output speed with the prime mover generating the necessary power at a speed at which the specific fuel consumption is a minimum.

Other objects and many of the attendant advantages of this invention will be readily appreciated as the same becomes better understood by reference to the following detailed description when considered in connection with the accompanying drawings, in which:

FIG. 1 is a fragmentary view of the power system incorporating control means in accordance with the invention;

FIG. 2 is a diagram indicating typical power system characteristics for a power system having a conventional shift-type transmission;

FIG. 3 is a diagram similar to FIG. 2 showing similar characteristics for a power system having a continuously variable drive ratio;

FIG. 4 is a diagram indicating the relationship between prime mover speed and power output for minimum specific fuel consumption;

FIG. 5 is a diagram similar to FIG. 4 indicating the relationship between prime mover torque and prime mover speed at constant throttle settings for minimum specific fuel consumption;

FIG. 7 is a cross-sectional view of a continuously variable transmission suitable for use with the present invention;

FIG. 8 is a schematic cross-sectional view taken along the lines 8—8 of FIG. 7;

FIG. 10 is a schematic illustration of a mechanical embodiment of the control system of FIG. 6;

FIG. 11 is a schematic view of the drive selector apparatus showing its relationship to the other elements of the present invention; and FIG. 12 is a schematic illustration showing modifications to the control system embodiment of FIG. 10 for dynamic braking.

Figure 6:
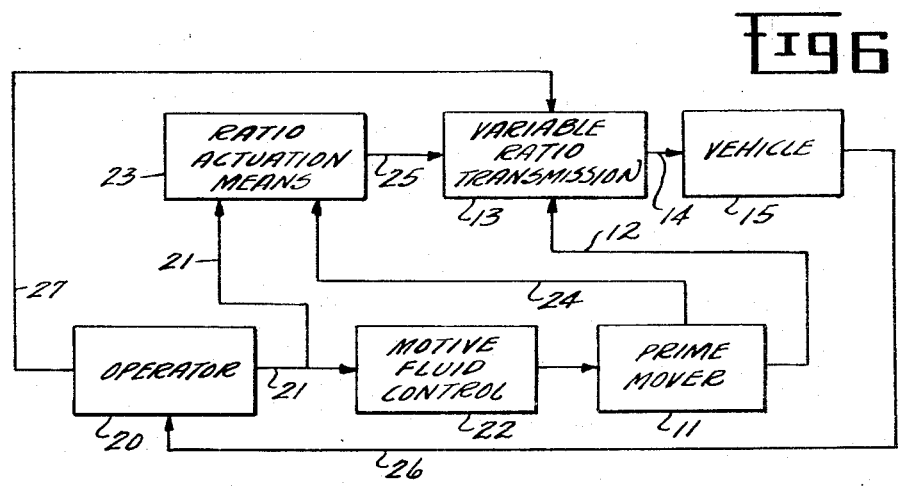
FIG. 6 is a block diagram of the entire power system for indicating schematically the elements and operations of the control system of this invention.

Referring first to FIG. 1, a conventional type of power system is illustrated, the power system comprising a prime mover 11 connected through a drive shaft 12 to a power transmission 13 from which extends a second drive shaft 14 to a load 15 which, as illustrated, is the differential of a wheeled vehicle from which a shaft 16 projects to drive one of the wheels (not shown). It will be understood, of course, that the load could be some sort of stationary apparatus and that, in any event, the output torque and output speed of the power system are related in a known manner to the torque transmitted through, and the rotary speed of, the drive shaft 14. The prime mover illustrated is an internal combustion gasoline engine and the prime mover will, for convenience, be sometimes called an "engine" in this description. It will be understood, however, that the control of this invention may be applied to any prime mover having a motive fluid input. A control unit 17 is illustrated with various mechanical connections to the individual components of the system which will be explained in detail later.

Before proceeding with a detailed discussion of the control system of the present invention, it is desirable to review briefly certain characteristics of power systems of the general type under discussion. The representative operating characteristics of a power system utilizing an internal combustion engine and a conventional "standard shift" transmission for driving a mobile vehicle are illustrated by FIG. 2. The power system output speed, or vehicle speed, is shown as the abscissa and the output torque is shown as the ordinate. The curves AB, CD, and EF represent the respective full throttle output characteristics of the low, intermediate, and high gear or drive ratios of the three speed standard shift transmission. With respect to each drive ratio, the left end of the applicable curve represents the characteristics at the lowest effective engine speed and the right end represents the characteristics at the maximum engine speed. Now, suppose that it is desired that the vehicle travel at a speed $q_1$ where the torque required at that speed is $q_2$. It is apparent from FIG. 2 that the desired output can be attained in high gear at full throttle, the point on curve EF of FIG. 2 being point Q. If, however, the vehicle were to start up a hill where the torque requirements to maintain speed are greater, it is clear that the torque output cannot be increased at the speed $q_1$ since the engine is already operating at full throttle. Therefore, the output speed will slow until a new equilibrium point on curve EF is reached at which the torque requirements are met.

As mentioned previously, the curves AB, CD, and EF of FIG. 2 represent the power system output characteristics for various drive ratios at full throttle. The prime mover is, of course, not always operated at full throttle; the broken lines of FIG. 2 indicate the partial throttle characteristics for operation in intermediate drive ratio at various constant throttle openings. For example, it will be obvious that the mobile vehicle can be driven at a speed of $q'_1$ where an output torque of $q'_2$ is required in the intermediate drive ratio with a throttle opening of approximately 25 percent.

The curves of FIG. 3 represent the output performance characteristics of a power system having a continuously variable drive ratio transmission instead of the "standard shift" transmission of FIG. 2. The broken lines of FIG. 3 indicate combinations of power system output speed and torque available for constant engine speeds or constant prime mover power output, with the prime mover operated at full throttle, the line connecting points H and J representing the combinations available at the maximum engine speed and horsepower. In other words, by changing the drive ratio of the power transmission, the power system is capable of producing the combination of output speed and torque indicated by any point along the line for a given prime mover speed.

Therefore, any combination of output speed and torque represented by a point on the line HJ of FIG. 3 can be produced by changing transmission drive ratio when the prime mover is operating at full throttle. From the discussion above with respect to FIG. 2, it is known that the same combination of output speed and torque can be produced by various combinations of lower drive ratios and partial throttle openings. The control arrangement of this invention automatically selects the drive ratio which, for a throttle opening selected by the operator, produces the desired power at the lowest level of specific fuel consumption.

Before proceeding to describe the actual arrangement of the control of this invention, attention is first directed to FIGS. 4 and 5 for some technical considerations. The power required to produce a given combination of power system output speed and torque is proportional to the product of the speed and the torque. With the losses in the system assumed to be negligible, the same horsepower must be produced by the prime mover. In FIG. 4, the broken line KL indicates the prime mover speeds at which required power levels of engine output can be produced with the lowest specific fuel consumption. For example, the prime mover produces horsepower $p_1$ with lowest fuel consumption when operating at speed $p_2$ and part throttle. The same output horsepower can be produced at full throttle with speed $p_3$, but the fuel consumption will be higher.

Referring now to FIG. 5, prime mover speed is shown as the abscissa and prime mover torque is shown as the ordinate. The curves represent various combinations of speed and torque for constant throttle openings. Now consider point P of FIG. 4. Since prime mover power is proportional to the product of prime mover speed and torque, the torque $t_1$ corresponding to the power $p_1$ can be readily determined and plotted on FIG. 5. In this manner, a line equivalent to the optimum fuel specific line of FIG. 4 can be generated on FIG. 5, this line being line MN. If the accelerator pedal of the power system and the throttle are directly interconnected, a given position of the pedal represents a given throttle opening and, if the prime mover is operating at its lowest fuel consumption, a given engine speed. To give the required system power output, this then requires a particular transmission drive ratio. The basic function of the control of this invention is to force the prime mover to operate on the optimum or minimum specific fuel consumption schedule by suitably varying the transmission drive ratio.

Referring next to FIG. 6, a block diagram is provided to aid in explaining schematically the elements and the operation of the control of the present invention. The system operator signals the transmission 13 through mechanism represented by line 27 of his desire to go forward, to go in reverse, or to remain in neutral. With the drive signal selected, the operator 20, desiring a certain system output speed, then adjusts the accelerator pedal accordingly and this feeds a required prime mover power output and speed signal 21 into both the motive fluid control 22, which is in most cases a carburetor or fuel metering device, and to the ratio actuation means 23 of the control 17. In direct response to the required speed signal 21, the motive fluid control 22 adjusts the motive fluid input to the prime mover 11; in other words, the throttle opening is directly adjusted. The relationship between the required engine speed and the throttle opening is, of course, that indicated by FIG. 5 for optimum specific fuel consumption. For example, an accelerator pedal position which produces a throttle opening of 60% will feed a desired engine speed signal $r_1$ into the ratio actuation means. An actual prime mover speed signal 24 is also fed into the ratio actuation means where the two signals 21 and 24 are compared and an output speed error signal acting through mechanism represented by line 25 adjusts the drive ratio of the variable ratio transmission 13. A change in the drive ratio will, however, cause the actual engine torque and speed to change, the actual speed signal 24 being changed accordingly. The drive ratio will continue to change until the actual prime mover speed is equal to the required speed. With the throttle opening fixed, the prime mover 11 will thus operate at its minimum specific fuel consumption rate for the power output. The power transmitted to the vehicle or load 15 through the drive shaft 14 will produce a power system output speed which may or may not be the desired system output speed. The actual power system output speed provides a signal 26 to the operator 20 who may mentally compare the actual and the desired system output speeds and modify the accelerator pedal position accordingly, the new signal 21 being in effect a speed error signal. As a result of this change, the prime mover 11 will change speed until it is operating at the minimum specific fuel consumption condition for the new throttle position and, of course, the drive ratio and the system output speed will also change. In this manner, the desired system output speed is attained with the prime mover operating at its minimum motive fluid consumption rate for the power output.

It will, of course, be obvious to those skilled in the art that the control concept of this invention can be used with various types of prime movers, although for discussion purposes it is assumed that the prime mover is a gasoline engine, and with various types of variable drive ratio transmissions. The control concept of the invention is particularly applicable to transmissions of the ball piston type and an embodiment suitable for such use will be described presently. Before describing the mechanical control arrangement, however, it is desirable to describe the ball piston transmission with which the control is to be used.

Referring now to FIG. 7, the power transmission 13 includes a housing comprising end bells 30 and 31 with a side cover 32. Extending through the end bell 30 is an input shaft 33 rotatably supported in a bearing 34 positioned between the end bell 30 and the shaft. A seal 35 surrounds the shaft 33 to keep dirt and other foreign matter out of the housing and to retain oil or lubricant within the power transmission. Shaft 33 has a splined end 36 for attachment to the drive shaft 12 extending from the prime mover 11 and extends into the housing with an end projecting into an opening 40 of an output shaft 41. This shaft 33 is rotatably supported within the end of the output shaft 41 by a bearing 42 thereby providing mutual support between these shafts while the output shaft is in turn rotatably supported from the end bell 31 within a bearing 43. The support of the shafts 33 and 41 is completed by bearings 73 and 74 in which the input shaft 33 runs. A seal 44 also extends between the shaft 41 and end bell 31 for the same purpose as seal 35. Output shaft 41 is provided with a splined end 45 for attachment to any driven load.

As illustrated by FIGS. 7 and 8, a planetary gear system is attached to the input shaft 33 of the power transmission and includes a sun gear 48 which rotates with the input shaft. Supported from the transmission output shaft 41 is a planet gear support member 49 supporting three planet gears 50 which engage the sun gear 48 and may rotate about their individual supporting shafts 51. A ring gear 52 extends around and engages these three planet gears 50 in a manner such that with the ring gear either not rotating or rotating at a different peripheral speed than the sun gear 48, a reaction results between the planet gears 50 and this ring gear 52 causing rotation of the output shaft 41. The maximum speed of this output shaft rotation is determined by the particular gear ratio between the sun gear 48, the planet gears 50, the ring gear 52 and, of course, the maximum speed of the input shaft 33.

The relative speed of rotation and therefore the gear or drive ratio between the input and output shafts may be varied by the relative rotation of the ring gear 52 with respect to the sun gear 48. If, for example, the sun gear 48 were rotated in the clockwise direction as indicated by the arrow on FIG. 8 and the ring gear 52 were held stationary, a counterclockwise rotation of the planet gears 50 would result thus causing a clockwise rotation of the planetary gear support 49 and the output shaft 41. However, if the ring gear 52 is accelerated in the counterclockwise direction, the rotation of the planet gears and hence the output shaft is decreased until the peripheral speed of the gear surface of the ring gear 52 is equal to the peripheral speed of the gear surface of the sun gear 48 at which time the planet gear support and the output shaft will remain stationary. Further acceleration of the ring gear 52 in that same direction serves to cause the planet gear support 49 to rotate in the counterclockwise direction. Similarly, if the ring gear 52 is rotated in the same direction as the sun gear 48, the planet gears 50 are caused to rotate at a speed equal to the sum of the peripheral speeds of these gears, thereby causing a faster rotation of the output shaft 41.

Figure 9:
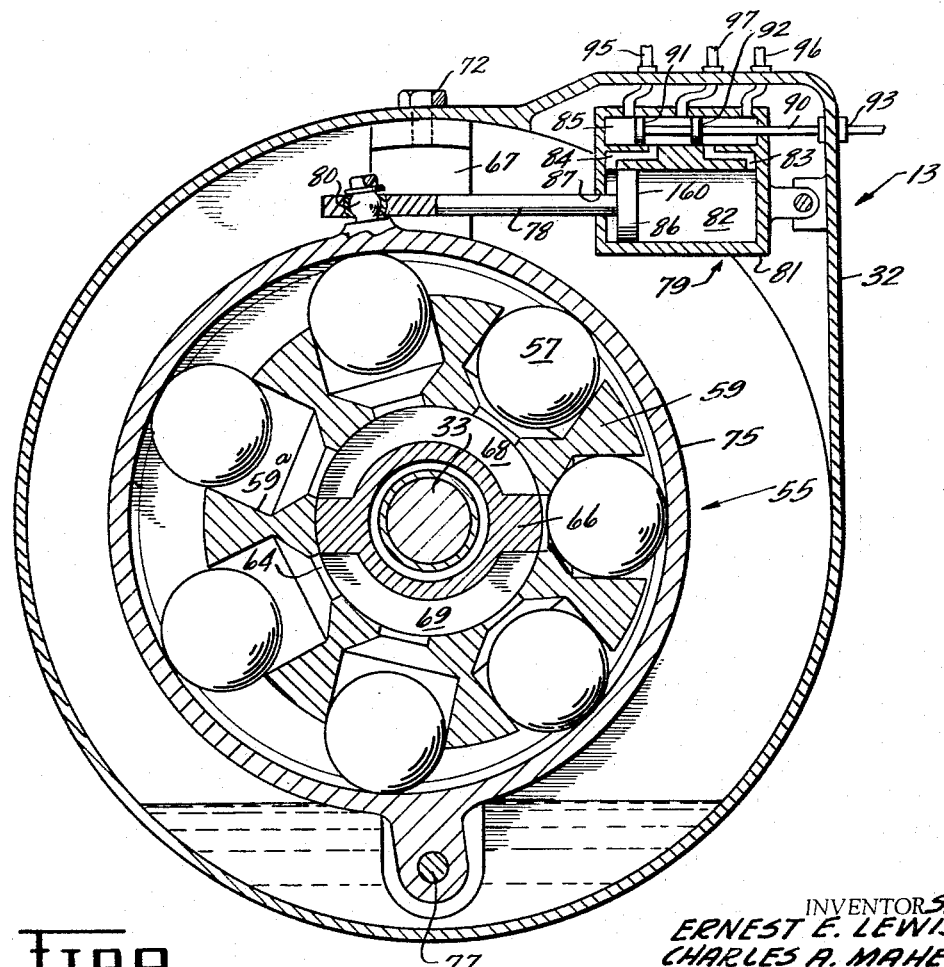
FIG. 9 is a cross-sectional view along the line 9—9 of FIG. 7 showing a variable pump apparatus used in the power transmission.

A hydraulic unit is provided for controlling the rotation of the ring gear 52, the hydraulic unit consisting of a variable displacement pump unit 55 and a motor unit 56, the pump unit 55 being further illustrated by FIG. 9. While these units are nominally referred to as pump and motor units, it should be understood that under certain conditions the functions of the units may be reversed; that is, the motor may act as a pump supplying power to drive the pump which will then be acting as a motor. The units 55 and 56 include rows of ball pistons 57 and 58 which may freely reciprocate within cylinder blocks 59 and 60, respectively. Pump cylinder block 59 is connected by flange 61 to rotate with the input shaft 33. The flange may be attached to the cylinder block 59 by any suitable means such as bolt fasteners 62; similarly cylinder block 60 is attached to and supports ring gear 52 for rotation. The ball pistons 57 and 58 reciprocate within cylinders 59a and 60a; however, as small a clearance as possible is provided to permit free movement of the ball pistons. Fluid passages 64 and 65 connecting with the cylinders are provided which open radially inward from the cylinder blocks. As illustrated in FIGS. 7 and 9, the cylinder blocks are rotated about a stationary pintle 66 in which is formed two axially extending fluid passages 68 and 69 which extend partially around the pintle.

Pintle 66 is supported by the pintle support member 67 extending from the housing side wall 32 and supported by bolt fasteners 72. The pintle and pintle support member also serve to support, as mentioned previously, the input shaft 33 for rotation by roller bearings 73 and the ball bearings 74 located between the shaft and pintle. Pump race 75 is pivotally supported from the pintle support member 67 by the bolt 77 with the diametrically opposite side of the race 75 supported by a positioning member 78 extending between the race and a race positioning actuator 79 connected to the race through a ball joint 80. The position of this race 75 may be varied with respect to the cylinder block 59 as will be explained in more detail later while motor race 76 in this embodiment is fixedly supported and eccentrically positioned with respect to the cylinder block 60 by the support member 76′ and the bolt 77 extending between the race and the pintle support 67.

The race positioning actuator 79 includes a housing 81 supported from the transmission side wall 32 with an internal cylindrical cavity 82 having fluid ports 83 and 84 connecting each respective end of the cavity 82 to another hydraulic control cavity 85. A piston 86 is located for reciprocal movement in the cavity 82 with the positioning rod or member 78 extending through an opening 87 in the housing 81 to the pivotal ball joint 80 on the race 75.

A control rod 90 extends through the opening 93 in the housing 32 and into the control cavity 85 with spaced pistons 91 and 92 attached thereto for reciprocal movement within the cavity 85. Fluid outlets 95 and 96 lead to the second cavity 85 with an inlet 97 situated between these outlets and leading from the cavity. By providing pressured fluid to the inlet 97 and by positioning the control rod 90, the fluid introduced into the cavity between spaced pistons 91 and 92 through inlet 97 will enter either of the inlet passages 83 or 84 to flow into the cavity 82 and thereafter force the piston 86 to move longitudinally within the cavity 82. This movement of the piston 86 moves the actuating arm 78 to pivot the race 75 about the bolt member 77 into an eccentric position with respect to the cylinder block 59. As will be explained later, this provides the pump unit 55 the variable positive displacement capability.

Any hydraulic fluid escaping from the hydraulic unit flows to the bottom of the housing to serve both to lubricate the moving parts of the transmission and to act as a reservoir to a pump 100 for replenishing the hydraulic fluid within the hydraulic unit. The pump 100 is driven by a gear 102 meshing with gear 101 on the input shaft 33. Check valves 103 and 104 are provided in the respective hydraulic lines 105 and 106 (illustrated as dotted lines) leading to the passages 68 and 69. In this manner, any fluid that need be replaced within the hydraulic unit is supplied to the low pressure passage of the pintle. Another hydraulic line 107 leads from the pump 100 to supply hydraulic fluid at a substantially constant make-up pressure to a positive displacement pump 108 driven by a gear 109 also meshing with the gear 101 in the input shaft 33. A hydraulic line 110 receives fluid from the pump 108 and supplies the fluid to the mechanical control of this invention. Hydraulic line 111 receives fluid from line 107 and also leads to the control to supply fluid thereto at the regulated make-up pressure.

The operation of the hydraulic unit will now be described. Turning to FIG. 9 and referring to the positions around the race 75 as numbers on a clock, it will be noted that as the cylinder block 59 rotates the balls 57 are forced outwardly by centrifugal force against the inner surface of the race 75. It should further be noted that as the balls ride along this inner surface of the race 75 the eccentricity of the race with respect to the cylinder block forces the balls to reciprocate within the cylinders 59a. If low pressure hydraulic fluid is introduced into the passage 69 in the pintle and the cylinder block is rotated in a clockwise direction, as the balls progress from the three o'clock position to the nine o'clock position, the cylinders 59a will be filled with the low pressure hydraulic fluid due both to the movement of the balls outwardly in these cylinders creating a low pressure region in the cylinder and also to the pressure of the hydraulic fluid in the passage 69 forcing flow into the cylinders. As the cylinders 59a pass the nine o'clock position, the fluid passageways 64 interconnect the cylinders 59a and the pintle passage 68. With the cylinders now proceeding from the nine o'clock position to the three o'clock position the ball piston 57 is forced inwardly into the cylinders 59a thereafter forcing fluid out of the cylinders through the ports 64 into the passage 68 at high pressure until the cylinders reach the three o'clock position; thereafter this cycle is repeated every revolution of the cylinder block. By controlling the amount of eccentricity of the ball pump race 75 with respect to the cylinder block, the total amount of fluid pumped by, or the capacity of, the ball pump during one revolution may be regulated; similarly, the position of race 76 could also be variable, but is not, of course, in the illustrated embodiment.

If the above described fluid flow is reversed, that is, if pressured fluid is forced into such a hydraulic unit causing the ball pistons to move outward due to the pressure created by the fluid, a reaction will be effected between the balls and eccentric race tending to cause relative rotation between the cylinder block and race. Therefore with the motor unit 56 connected to the pintle passages 68 and 69, the pump unit 55 may be utilized to drive this motor unit and in this manner a continuously variable speed range may be provided between the pump unit 55 and the motor unit 56 by varying the eccentricity of the pump unit 55. If the pump unit 55 and the motor unit 56 have the same capacity, their rotational speed will be the same. With the race 76 of the motor unit 56 fixed, it will be seen that the speed of the motor unit is controlled by the eccentricity of the race 75. If the capacity of the pump unit 55 is greater than that of the motor unit 56, the motor unit 56 must rotate faster than the pump unit 55 to handle the same amount of fluid. Further, by reversing the eccentricity of the pump unit the motor unit may be driven in a reverse direction.

Keeping in mind the operation of the hydraulic unit and the operation of the planetary gear system as explained heretofore, it can be seen that in controlling the rotation of ring gear 52 by controlling the rotation of the motor unit 55, the relative rotation between the input shaft 33 and the output shaft 41 may be varied. The capabilities of relative rotation of the input and output shafts of the power transmission are controlled in part by the relative sizes of the gears in the planetary gear system. The relative size of the cylinders 59a and 60a in the hydraulic unit cylinder blocks and the maximum stroke to which the race 75 may be adjusted determine the capacities of the units and hence the relative speeds of rotation of the pump and motor units. An even greater drive ratio may be effected by allowing the positioning of the ball piston motor unit race 76 to be varied. The subject transmission also serves to effect a reversal of the direction of rotation of the output shaft 41 with respect to the input shaft 33 by allowing the pump unit 55 to drive the motor unit 56 in the opposite direction from that of the input shaft by shifting the eccentric positioning of the race 75 to the opposite side of the cylinder block 59. Further, this rotation in the reverse direction as well as the rotation in the forward direction is continuously variable because the pumping capabilities of the hydraulic pump unit 55 are made continuously variable by shifting the position of the race 75.

More particularly, the eccentricity of the race 75 and, therefore, the transmission drive ratio are controlled in accordance with the positioning of the control rod 90 and the pistons 91 and 92 in the control cavity 85. When the positioning member 78 positions the race 75 such that there is no eccentricity, there will be no pumping and therefore no movement of the ring gear 52. As described in detail earlier, the output shaft 31 under these conditions will be driven in the forward direction through the sun gear 48 and the planet gears 50. If a speed increase in the forward direction is called for, the control rod 90 will be moved to the left to increase pressure on the right face 160 of the piston 86. This will rotate the race 75 counterclockwise about the bolt 77 to drive the motor unit 56 and the ring gear 52 in the same direction as the input shaft 33 and thus increase the speed of the output shaft 41. This is increasing the drive ratio. Movement of the control rod 90 to the right will cause movement of the positioning member 78 to the right and, thus, movement of the race 75 in a clockwise direction about the bolt 77. This decreases the drive ratio until peripheral speed of the ring gear 52 is the same as, but oppositely directed to, that of the sun gear 48. At this point, the output shaft 41 does not rotate. Further clockwise movement of the race 75 will cause reverse motion of the output shaft 41 and the associated vehicle.

With reference now to FIG. 10, a mechanical control embodiment capable of providing the function of the schematic ratio actuation means 23 forming a portion of the control system of FIG. 6 is illustrated. As described previously, the ratio actuation means 23 receives input signals 21 and 24 representing required and actual prime mover speed, compares these signals, and transmits a speed error signal acting through mechanism represented by line 25 to the transmission 13 to adjust the drive ratio. In the mechanical arrangement of FIG. 10, the operator indicates a desired system output speed by adjusting the position of an accelerator pedal 121. The pedal 121 is connected through a linkage 122 to the motive fluid control 22, a carburetor in the illustrated embodiment, where the fuel supply is directly controlled as a function of pedal position. Depressing the pedal 121 will increase the throttle opening and thus tend to increase speed; a compression spring 124 will raise the pedal 121 and decrease the throttle opening when pressure on the pedal by the operator is released. The pedal position is also transmitted through a linkage 125 to position a pin 126 at the lower end of a control bar or link 127. Depressing the pedal 121, increasing the desired speed, moves the pin 126 to the left, while releasing the pedal 121 moves the pin 126 to the right. Holding the pedal 121 in a fixed position also holds the pin 126 in a fixed position. In this manner, the required engine speed 21 of FIG. 6 is supplied both to the motive fluid control 22 in the form of a required throttle opening and to the ratio actuation means 23.

The manner in which the actual engine speed signal 24 is supplied to the ratio actuation means 23 and the manner in which the two signals are compared will now be described. The positive displacement pump 108 located within the transmission 13, as shown by FIG. 7, is supplied with regulated make-up pressure and is driven by the gears 101 and 109 at a speed directly proportional to the engine speed and hence produces a flow proportional to the engine speed. This flow is directed through hydraulic line 110 to the ratio actuation means 23 where it is supplied to a piston cavity 130, from which it exits through a metering orifice 131 to a drain 132 leading back to the transmission reservoir. A piston 133 within the cavity 130 is loaded by a spring 134 having a substantially constant force so as to close the orifice 131 unless the fluid pressure within the cavity 130 is sufficient to achieve force balance by acting on the piston. The preload on the spring 134 is approximately equal to a force equivalent to the product of the regulated make-up pressure and the area of the piston 33. If the engine speed increases, the flow produced by the pump 108 will increase, the pressure in the cavity 130 will rise, and the piston 133 will move to the right. This, however, will open the orifice 131 to reduce the pressure. As a result, the piston 133 and, consequently, the pin 135, to which the piston and the spring are connected, at the upper end of the control bar 127 quickly reach equilibrium positions for any engine speed. More particularly, an increase in engine speed will result in the pin 135 moving to the right as viewed in FIG. 10 while a speed decrease will have the opposite effect.

On the control bar 127, an intermediate pin 136 is positioned in accordance with the relative positions of pins 126 and 135 at opposite ends of the control bar. Pin 136 is connected to a pilot valve stem 137 leading to a pilot valve 138 having two small spaced pistons 140 and 141. The position of the pin 136 and, therefore, the position of the pilot valve pistons 140 and 141 are proportional to the speed error, which is the difference between the required speed and the actual speed as indicated by the positions of the pins 126 and 135. The pilot valve 138 controls the flow of hydraulic fluid to piston cavities 142 and 143 on opposite sides of a half-area drive ratio control piston 144, the hydraulic fluid being supplied to the cavity 142 by hydraulic line 111 from the pump 100 in the transmission. The piston cavities 142 and 143 are ported to the pilot valve 138 through hydraulic lines 145 and 146, respectively. The pilot valve 138 is also ported to the drain 132. The pilot valve lands 140 and 141 and the ports communicating with lines 111, 145, 146, and 132 are positioned and proportioned such that the pressure in the cavity 143 is one-half of that in the cavity 142 when the pin 136 is in a zero speed error position or, stated differently, when the required speed and the actual speed are the same. With the area of face 147 of the control piston 144 being one-half that of face 148, it will be obvious that the control piston 144 is in a null position in which the pressure forces acting on it are balanced. The piston 144 is connected to a link 149 which leads to the transmission to set the drive ratio in accordance with its position. The link 149 is connected to the control rod 90 extending into the housing 32 of the transmission as shown by FIG. 9 through a drive selector (not shown) which converts the motion of the link 149 into proper motion of the rod 90 in accordance with the operator's instruction with respect to direction of drive.

For an example, suppose that the operator wishes to increase the vehicle speed. He depresses the accelerator pedal 121 which directly opens the throttle and moves pin 126 to the left. Since the actual engine speed does not change immediately, pin 136 also moves to the left carrying pistons 140 and 141 with it. The port opening to line 145 is further opened and the port to the drain 132 is further closed, the result being a pressure increase in cavity 143 moving the piston 144 to the left to change the drive ratio in the transmission. At the same time, the relatively slow increase in actual engine speed is increasing the pressure in cavity 130 and causing pin 135 to move to the right, the pin 136 thus tending to return to the right to its zero speed error position. This, of course, begins to reduce the pressure in the cavity 143. When the pin 136 finally reaches its zero error speed position, the pressure forces acting on the opposite faces 147 and 148 of the piston 144 are again balanced, but the piston 144 is in a new axial position and the transmission is operating at a new drive ratio at which the required and actual engine speeds are both equal to the engine speed at which the fuel consumption is lowest for the throttle setting. At this point, the operator can compare the new vehicle speed with that desired. In the event that the actual and desired vehicle or system output speeds are not the same, the operator can make suitable adjustments in the position of the accelerator pedal 121.

At an earlier point in this specification, where discussing the schematic block diagram of FIG. 6, it was stated that the relationship between the required engine speed and the throttle opening is that indicated by FIG. 5 for optimum fuel consumption. As an example, it was pointed out that an accelerator pedal position which produces a throttle opening of 60% will feed a desired engine speed signal $r_1$ into the ratio actuation means. The mechanical control arrangement just described must also maintain the proper relationships between speed and throttle position. This can be done in a control for an actual power system by proper sizing and positioning of the various elements which comprise the control arrangement.

It is noted above that the link 149 from the ratio actuation means 23 is connected to the control rod 90 extending into the housing 32 of the transmission as shown by FIG. 9 through a drive selector for converting the motion of the link 149 into proper motion of the rod 90. Although its detailed features are not considered to be a part of the present invention, a suitable connection of this type is shown by FIG. 11. A drive selector 160 includes a body member 161 rotatably mounted in a bearing 162, the link 149 being pinned to the body 161 at 163 such that the rotational position of the body member 161 is controlled by the position of link 149. A bell crank 164 is pivotally mounted on the body 161 at 165, one end of the bell crank being connected at 166 to a longitudinally movable shaft 167 and the other end of the bell crank being connected at 168 to the control rod 90. The shaft 167 is moved by the operator to one of three positions in which a spring loaded ball 170 engages a detent to lock the shaft 167 in axial position. With the ball 170 engaging detent 171, the bell crank assumes the position shown by solid lines in FIG. 11 and motion of the link 149 is directly transmitted to the control rod 90 through the member 161 and the bell crank 164 such that movement of the link 149 to the left causes movement of the rod 90 to the left, and vice versa. The resulting effect on race 75 has been discussed previously. This is the setting for forward motion. If, however, the ball 170 is engaging detent 172, the bell crank assumes an intermediate position in which the point 168 is on the axis of rotation of the body member 161. As a result, motion of the link 149 and rotation of the body member 161 has no effect on the position of the control rod 90. This is the neutral setting for the transmission since the control rod 90 and the pistons 91 and 92 are positioned such that the race 75 is in its neutral position when the point 168 is on the axis of rotation of the body member 161. When the ball 170 engages detent 173, the bell crank 164 assumes an overcenter position in which movement of the link 149 is converted into oppositely directed motion of the control rod 90. This is the position calling for reverse rotation of the output shaft 41. The rod 90 has a universal joint or similar connection therein for permitting the motion of the rod 90 as just described.

The control means of the present invention can also be used to provide dynamic braking control. In order to provide the dynamic braking capability, the control embodiment of FIG. 10 is modified as shown by FIG. 12, a dynamic braking pedal 180 and a link 181 being added to the linkage 125. The link 181 has an elongated slot 182 therein so that the dynamic braking elements have no effect on the normal operation described heretofore. To describe the operation of the dynamic braking control, assume that the vehicle begins to descend a long grade. The operator will release foot pressure on the accelerator pedal 121 and thus call for both reduced motive fluid supply and reduced engine speed. The pin 136 will indicate an overspeed condition, and the piston 144 will move to the right to change the drive ratio of the engine accordingly. To change the drive ratio such that the vehicle's stored, or potential energy, can be used to drive the prime mover, a gasoline engine in the illustrated embodiment, and thereby slow the vehicle, the operator depresses the dynamic braking pedal to move pin 126 to the left to indicate a required engine speed. When the required speed is greater than the actual engine speed, the stored energy of the vehicle will be used to accelerate the engine. The drive ratio of the transmission can be modulated continuously to maintain the engine at the desired speed. The operator, therefore, when he begins a descent on a long downgrade, simply removes his foot from the accelerator pedal 121 and depresses the dynamic braking pedal 180 until he is able to limit the vehicle speed at whatever value he wishes. To prevent excessive engine overspeeds, an adjustable stop 183 is placed under the pedal 180 to limit the amount of input signal attainable. It should be noted that the dynamic braking control means has no effect on the setting of the throttle.

It will thus be seen that the control means of the present invention continuously compares the actual prime mover speed with a prime mover speed required to produce a required power output at minimum specific fuel consumption and continuously adjusts the transmission drive ratio until the actual prime mover speed is equal to the required prime mover speed. It will also be seen that, so long as the maximum power output capabilities of the power system are not exceeded, the control means of the invention permits the attainment of any power system output speed desired from the power system by an operator, the control means selecting a transmission drive ratio which produces the desired system output speed with the prime mover generating the necessary power at a speed at which the specific fuel consumption is a minimum.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to secure by Letters Patent of the United States is:

1. In a power system including a prime mover powered by a motive fluid, a continuously variable drive ratio transmission, and a driven load; control means comprising:
   (a) means to generate a signal indicating a speed and power output required of the prime mover,
   (b) throttle means for controlling the motive fluid input to the prime mover,
   (c) a control bar,
   (d) linkage means interconnecting said required speed signal generating means to both said throttle means and a first end of said control bar to position said throttle means and said end of said control bar in accordance with the required speed and power, the setting of said throttle being such that the motive fluid input rate at any required prime mover speed and power output is the minimum possible for the speed and power,
   (e) a spring having a substantially constant spring force connected to a second end of said control bar and biasing said second end in a first direction,
   (f) a positive displacement pump driven by the prime mover to generate a fluid flow signal proportional to the actual speed of the prime mover,
   (g) a piston cavity having first and second ports in the wall thereof, said first port communicating with the positive displacement pump for receiving fluid flow therefrom and said second port communicating with a drain,
   (h) a piston located for reciprocal movement within said cavity and connected to the second end of said control bar,
   (i) said first port adjacent an end of said cavity such that fluid admitted therethrough produces a force on said piston urging the second end of said control bar in a second direction oppositely directed to said first direction and said second port in an intermediate location along the axis of said cavity,
   (j) said second end of said control bar assuming an equilibrium position in accordance with the actual prime mover speed in which the force exerted on said piston by the fluid is equal to the force exerted on the second end of said control bar by said spring,
   (k) the position of an intermediate point on said control bar indicating the difference between the required speed and the actual speed of the prime mover as indicated by the first and second ends of said control bar,
   (l) a source of pressurized fluid,
   (m) a drive ratio control piston assembly having a control piston located for reciprocal movement within a piston cavity having a first port for the introduction of pressurized fluid from said source on a first side of said piston,
   (n) valve means receiving pressurized fluid from the first side of said control piston through a second port,
   (o) said valve means connected to the second side of said control piston through a third port and to a drain through a fourth port for transmitting pressurized fluid from the first side of said piston to the second side and the drain in accordance with the position of said valve means,
   (p) means interconnecting said valve means and said intermediate point on said control bar for positioning said valve means in accordance with the position of said intermediate point,
   (q) said valve means being positioned by said interconnecting means such that the pressure forces on the first and second sides of said control piston are equal and said piston is in an equilibrium position when the position of said intermediate point indicates that the required and actual prime mover speeds are equal and such that the pressure forces on the first and second sides of said control piston are unbalanced so as to cause movement of said piston when the position of said intermediate point indicates that the required and actual prime mover speeds are different,
   (r) and means connected to said control piston and the transmission to adjust continuously the drive ratio of the continuously variable drive ratio transmission in accordance with the position of the control piston,
   (s) the drive ratio being adjusted continuously until the actual prime mover speed is equal to the required speed so that the prime mover operates at a condition of optimum motive fluid consumption.

2. Control means as defined by claim 1 in which the first side of said control piston has an area exposed to the pressurized fluid equal to one-half of the area of the second side of said piston.

3. In a power system including a prime mover powered by a motive fluid, a continuously variable drive ratio transmission, and a driven load; control means comprising:

(a) means to generate a signal indicating a speed required of the prime mover,
(b) a control bar,
(c) a linkage interconnecting said required speed signal generating means and a first end of said control bar to position said end in accordance with the required speed,
(d) a spring having a substantially constant spring force connected to a second end and biasing said second end in a first direction,
(e) a positive displacement pump driven by the prime mover to generate a fluid flow signal proportional to the actual speed of the prime mover,
(f) a piston cavity having first and second ports in the wall thereof, said first port communicating with the positive displacement pump for receiving fluid flow therefrom and said second port communicating with a drain,
(g) a piston located for reciprocal movement within said cavity, and connected to the second end of said control bar,
(h) said first port adjacent an end of said cavity such that fluid admitted therethrough produces a force on said piston urging the second end of said control bar in a second direction oppositely directed to said first direction and said second port in an intermediate location along the axis of said cavity,
(i) said second end of said control bar assuming an equilibrium position in accordance with the actual prime mover speed in which the force exerted on said piston by the fluid is equal to the force exerted on the second end of said control bar by said spring,
(j) the position of an intermediate point on said control bar indicating the difference between the required speed and the actual speed of the prime mover as indicated by the first and second ends of said control bar,
(k) a source of pressurized fluid,
(l) a drive ratio control piston assembly having a control piston located for reciprocal movement within a piston cavity having a first port for the introduction of pressurized fluid from said source on a first side of said piston,
(m) valve means receiving pressurized fluid from the first side of said control piston through a second port,
(n) said valve means connected to the second side of said control piston through a third port and to a drain through a fourth port for transmitting pressurized fluid from the first side of said piston to the second side and the drain in accordance with the position of said valve means,
(o) means interconnecting said valve means and said intermediate point on said control bar for positioning said valve means in accordance with the position of said intermediate point,
(p) said valve means being positioned by said interconnecting means such that the pressure forces on the first and second sides of said control piston are equal and said piston is in an equilibrium position when the position of said intermediate point indicates that the required and actual prime mover speeds are equal and such that the pressure forces on the first and second sides of said control piston are unbalanced so as to cause movement of said piston when the position of said intermediate point indicates that the required and actual prime mover speeds are different,
(q) and means connected to said control piston and the transmission to adjust continuously the drive ratio of the continuously variable drive ratio transmission in accordance with the position of the control piston.

4. A power system for driving a load, said power system comprising:
(a) a prime mover powered by a motive fluid,
(b) a continuously variable drive ratio transmission interconnecting said prime mover and said load,
(c) said transmission having a variable positive displacement ball piston pump and motor,
(d) a variable race for controlling the stroke of said ball piston pump,
(e) means for adjusting the race stroke to vary the drive ratio of said transmission,
(f) a motive fluid control for controlling the motive fluid input to said prime mover,
(g) means to generate a signal indicating a speed and power output required of the prime mover and to control the motive fluid input such that the input rate is the minimum possible for the required speed and power output,
(h) means to generate a signal indicating the actual speed of the prime mover,
(i) means to compare the required prime mover speed signal and the actual prime mover speed signal and to generate a speed error signal,
(j) and means responsive to the speed error signal to adjust continuously the means for varying the drive ratio of the continuously variable drive ratio transmission until the actual prime mover speed is equal to the required prime mover speed,
(k) whereby the prime mover operates at a condition of optimum motive fluid consumption.

5. A power system as defined by claim 4 including drive selector means for controlling the direction of power transmitted through said transmission from the prime mover to the load.

6. A power system for driving a load wherein an operator generates a signal indicating a desired system output speed, said power system comprising:
(a) a prime mover powered by a motive fluid,
(b) a continuously variable driver ratio transmission interconnecting said prime mover and said load,
(c) said transmission having a variable positive displacement ball piston pump and motor,
(d) a variable race for controlling the stroke of said ball piston pump,
(e) means for adjusting the race stroke to vary the drive ratio of said transmission,
(f) a motive fluid control for controlling the motive fluid input to said prime mover,
(g) means directly responsive to the desired system output speed signal to generate a signal indicating a speed and power output required of the prime mover and to control the motive fluid input to said prime mover such that the input rate is the minimum possible for the required speed and power output,
(h) means to generate a signal indicating the actual speed of the prime mover,
(i) means to compare the required prime mover speed signal and the actual prime mover speed signal and to generate a speed error signal,
(j) and means responsive to the speed error signal to adjust continuously the means for varying the drive ratio of the continuously variable drive ratio transmission until the actual prime mover speed is equal to the required prime mover speed,
(k) whereupon the operator may compare the desired system output speed and the actual system output speed produced by the required prime mover speed and the drive ratio selected by the drive ratio adjusting means and generate a modified signal indicating the desired system output speed so that the desired system output speed may be attained with the prime mover operating at a condition of optimum motive fluid consumption.

7. A power system as defined by claim 6 including drive selector means for controlling the direction of power transmitted through said transmission from the prime mover to the load.

8. In a power system including a prime mover powered by a motive fluid, a continuously variable drive ratio transmission, and a driven load; control means comprising:
- (a) first signal generating means to generate a signal indicating a speed and power output required of the prime mover;
- (b) throttle means for controlling the motive fluid input to the prime mover;
- (c) a control bar;
- (d) linkage means interconnecting said first signal generating means to both said throttle means and a first end of said control bar to position said throttle means and said end of said control bar in accordance with the required speed and power, the setting of said throttle being such that the motive fluid input rate at any required prime mover speed and power output is the minimum possible for the speed and power;
- (e) a positive displacement pump driven by the prime mover to generate a fluid flow signal proportional to the actual speed of the prime mover;
- (f) positioning means responsive to the fluid flow signot to position a second end of said control bar in accordance with the actual speed of the prime mover;
- (g) said positioning means comprising:
  - (1) a spring having a substantially constant spring force connected to said second end and biasing said second end in a first direction,
  - (2) a piston cavity having first and second ports in the wall thereof, said first port communicating with the positive displacement pump for receiving fluid flow therefrom and said second port communicating with a drain,
  - (3) a piston located for reciprocal movement within said cavity and connected to the second end of said control bar,
  - (4) said first port being adjacent to the end of said cavity such that fluid admitted therethrough produces a force on said piston urging the second end of said control bar in a second direction oppositely directed to said first direction and said second port being an intermediate location along the axis of said cavity,
  - (5) whereby for any actual prime mover speed the second end of said control bar assumes an equilibrium position in which the force exerted on said piston by the fluid is equal to the force exerted on the second end of said control bar by said spring;
- (h) the position of an intermediate point on said control bar indicating the difference between the required speed and the actual speed of the prime mover;
- (i) a drive ratio control piston assembly having a control piston located for reciprocal movement within a piston cavity having ports for the introduction of pressurized fluid on opposite sides of said piston;
- (j) a source of pressurized fluid;
- (k) valve means connected to said source of pressurized fluid and to said control piston assembly for controlling the supply of pressurized fluid to opposite sides of said piston;
- (l) means interconnecting said valve means and said intermediate point on said control bar for positioning said valve means and thereby controlling the pressure forces acting on opposite sides of said control piston in accordance with the position of said intermediate point;
- (m) the pressure forces acting on opposite sides of said piston being equal when the position of said intermediate point indicates that the required and actual prime mover speeds are equal;
- (n) and means connected to said control piston and the transmission to adjust continuously the drive ratio of the continuously variable drive ratio transmission in accordance with the position of the control piston.

References Cited by the Examiner

UNITED STATES PATENTS

| | | | |
|---|---|---|---|
| 2,523,726 | 9/1950 | Seeger | 74—472.1 X |
| 2,707,405 | 5/1955 | Forster | 74—472.1 |
| 3,202,012 | 8/1965 | Jania | 74—472.1 |

DAVID J. WILLIAMOWSKY, *Primary Examiner.*

L. H. GERIN, *Assistant Examiner.*